(12) United States Patent
Johar et al.

(10) Patent No.: US 11,221,899 B2
(45) Date of Patent: Jan. 11, 2022

(54) EFFICIENT MEMORY UTILISATION IN A PROCESSING CLUSTER HAVING A SPLIT MODE AND A LOCK MODE

(71) Applicant: Arm Limited, Cambridge (GB)

(72) Inventors: Kauser Yakub Johar, Cambridge (GB); Loïc Pierron, Cambridge (GB)

(73) Assignee: Arm Limited, Cambridge (GB)

( * ) Notice: Subject to any disclaimer, the term of this patent is extended or adjusted under 35 U.S.C. 154(b) by 295 days.

(21) Appl. No.: 16/580,045

(22) Filed: Sep. 24, 2019

(65) Prior Publication Data

US 2021/0089381 A1    Mar. 25, 2021

(51) Int. Cl.
| | |
|---|---|
| G06F 9/38 | (2018.01) |
| G06F 11/07 | (2006.01) |
| G06F 13/40 | (2006.01) |
| G06F 9/52 | (2006.01) |
| G06F 13/16 | (2006.01) |
| G06F 11/16 | (2006.01) |

(52) U.S. Cl.
CPC ........ *G06F 11/0751* (2013.01); *G06F 9/3877* (2013.01); *G06F 9/526* (2013.01); *G06F 11/0724* (2013.01); *G06F 11/16* (2013.01); *G06F 11/1629* (2013.01); *G06F 13/1668* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 7,028,218 B2* | 4/2006 | Schwarm | G06F 11/2038 711/162 |
| 2005/0240806 A1* | 10/2005 | Bruckert | G06F 11/1658 714/6.11 |

* cited by examiner

*Primary Examiner* — Michael Sun
(74) *Attorney, Agent, or Firm* — Nixon & Vanderhye P.C.

(57) ABSTRACT

An apparatus is described comprising a cluster of processing elements. The cluster having a split mode in which the processing elements are configured to process independent processing workloads, and a lock mode in which the processing elements comprise at least one primary processing element and at least one redundant processing element, each redundant processing element configured to perform a redundant processing workload for checking correctness of a primary processing workload performed by the primary processing element. Each processing element has an associated local memory comprising a plurality of memory locations. A local memory access control mechanism is configured, during the lock mode, to allow the at least one primary processing element to access memory locations within the local memory associated with the at least one redundant processing element.

18 Claims, 10 Drawing Sheets

EFFICIENT MEMORY UTILISATION IN A PROCESSING CLUSTER HAVING A SPLIT MODE AND A LOCK MODE

BACKGROUND

Technical Field

The present technique relates to the field of data processing.

Technical Background

In some fields, it can be important to provide processing hardware which provides a certain level of guarantee of functional safety. For example this can be useful for processing systems designed for the use in the automotive field, such as processors for controlling the braking or steering system in a vehicle. One technique for providing functional safety can be to provide a lock mode in which a redundant processing element may duplicate the same processing workload that is being performed by a primary processing element, so that the outcomes can be compared to detect errors.

When designing a cluster of processing elements (for example a cluster of central processing units (CPUs)), a split lock configuration may be adopted to provide flexibility in how the processing elements are used. A decision can then be taken (for example at integration time) as to whether to run the cluster in a split mode where the processing elements can be truly independent allowing them to execute their own tasks, or in the above-mentioned lock mode (which may also be referred to as lock-step mode) where a redundant processing element is running the same task as a primary processing element.

It is a growing trend for silicon providers to have a "one silicon multiple use" model where the processor cluster is built according to a split-lock design and then, depending on the target application, either turned into a split only or lock-step only cluster. It is often the case in such designs that the individual processing elements are provided with their own local storage resources (for instance random access memory (RAM) structures), for example to implement cache structures or tightly coupled memory (also referred to as scratchpad memory). Whilst these local storage resources can be efficiently utilised when operating in split mode (where each processing element can independently use its own local storage resources), when operating in lock mode the primary and redundant processing elements are executing the same workload and will share the same local storage resources. This typically means that the local storage resources of the primary processing element are used, but the local storage resources of the redundant processing element go unused when in lock mode.

SUMMARY

At least some examples provide an apparatus comprising:
a cluster of processing elements, having a split mode in which the processing elements are configured to process independent processing workloads, and a lock mode in which the processing elements comprise at least one primary processing element and at least one redundant processing element, each redundant processing element configured to perform a redundant processing workload for checking correctness of a primary processing workload performed by the primary processing element;

each processing element having an associated local memory comprising a plurality of memory locations; and
a local memory access control mechanism that is configured, during the lock mode, to allow the at least one primary processing element to access memory locations within the local memory associated with the at least one redundant processing element.

At least some examples provide a method for operating a data processing apparatus comprising a cluster of processing elements, comprising:
when operating the cluster in a split mode, processing independent processing workloads on the processing elements of the cluster;
when operating the cluster in a lock mode, arranging the processing elements to comprise at least one primary processing element and at least one redundant processing element, performing a primary processing workload on the at least one primary processing element, and performing on the at least one redundant processing element a redundant processing workload for checking correctness of the primary processing workload performed by the primary processing element;
providing each processing element with an associated local memory comprising a plurality of memory locations; and
during the lock mode, employing a local memory access control mechanism to allow the at last one primary processing element to access memory locations within the local memory associated with the at least one redundant processing element.

In accordance with other example, an apparatus is provided comprising:
a cluster of processing means, having a split mode in which the processing means are configured to process independent processing workloads, and a lock mode in which the processing means comprise at least one primary processing means and at least one redundant processing means, each redundant processing means for performing a redundant processing workload for checking correctness of a primary processing workload performed by the primary processing means;
each processing means having an associated local memory means comprising a plurality of memory locations; and
local memory access control means for allowing, during the lock mode, the at last one primary processing means to access memory locations within the local memory associated with the at least one redundant processing means.

Further aspects, features and advantages of the present technique will be apparent from the following description of examples, which is to be read in conjunction with the accompanying drawings.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
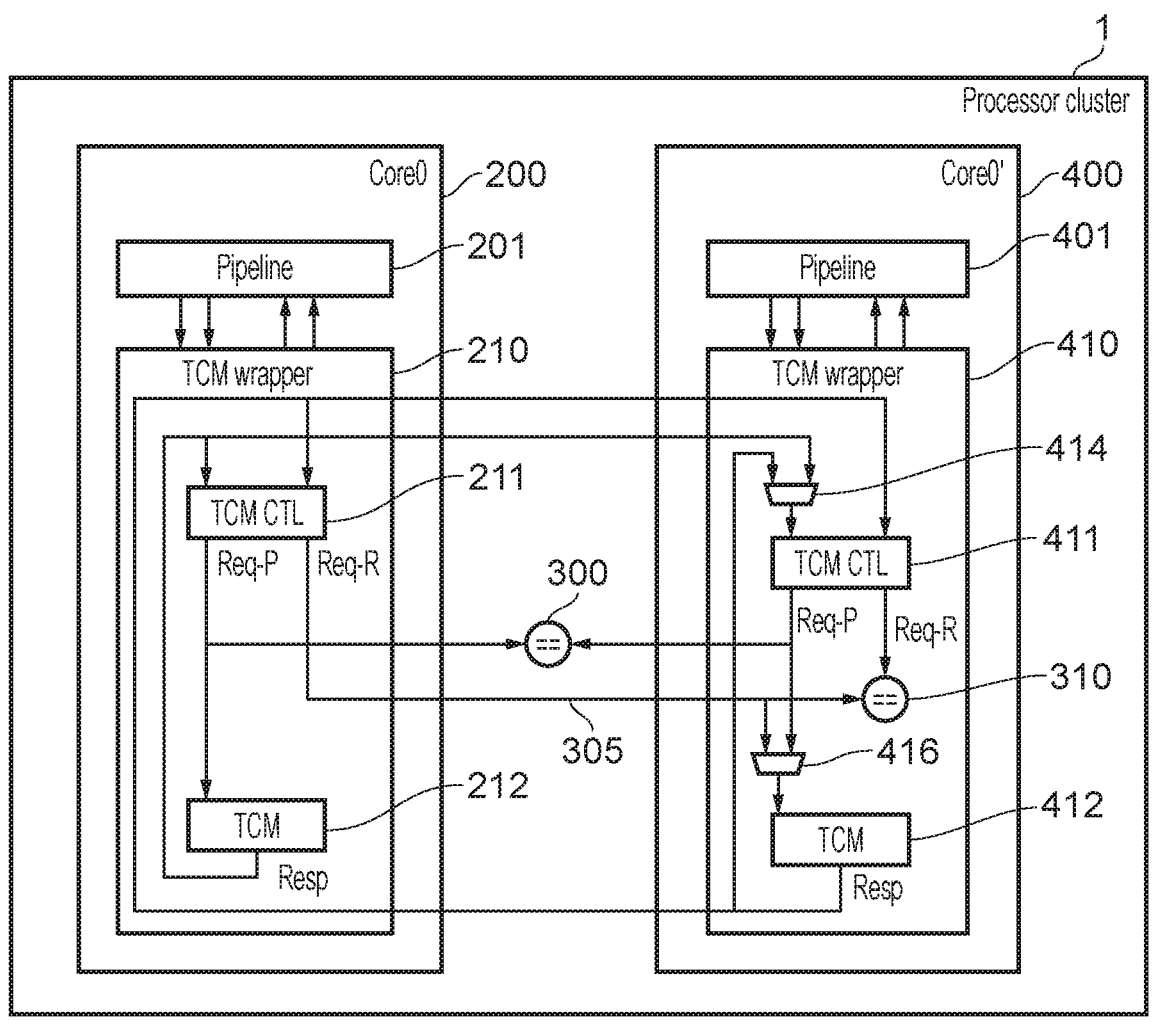
FIG. 1 schematically illustrates a processing cluster according to an example implementation.

Some specific examples are discussed below. It will be appreciated that the invention is not limited to these examples.

As discussed earlier, some systems may provide a split-lock configuration where a cluster of processing elements can be operated in a split mode or a lock mode depending on the application. In split mode each processor executes an independent workload, whilst in lock mode one of the processors acts as the primary processor and at least one as the redundant processor. In lock mode both processors execute the primary processing workload with information (for example the results of operations) generated by the redundant processor being used to check correctness of operation of the primary processor.

Each processor in a cluster may be provided with an associated local memory. In one example implementation this associated local memory is Tightly Coupled Memory (TCM), also referred to as scratchpad memory. TCM is typically provided close to the associated processor to improve access times, and provides memory locations within the memory address space addressable by access requests issued by the associated processor. Memory that has its own address space is sometimes referred to as golden memory, and hence it will be understood that TCM is a form of golden memory. It is not a cache and does not store copies of data held in main memory, but instead is allocated its own region of addresses within the memory address space distinct from the addresses used when accessing main memory. In split mode, each core is able to utilise its own TCM. In some systems, when operating in lock mode both the primary processor and the redundant processor run the same workload, and that workload operates within the memory address space of the primary processor. As a result only the TCM of the primary processor is available to use (in addition to any main memory resources) and the TCM of the redundant processor is unused. The present technology provides a method by which both the TCMs associated with the primary and the redundant processing cores can be accessed when in lock mode. Whilst the examples given herein will concentrate on TCMs, the techniques described herein may be adapted to be used in association with other local storage devices such as local caches, which would hence enable the effective cache capacity to be increased when in lock mode.

In the examples below, a processing cluster operating in the lock mode includes a primary processing element and a redundant processing element. It will however be appreciated that the present technique could be applied to a processing cluster with more than one primary processing element and/or more than one redundant processing element.

The apparatus of the present technology includes a cluster of processing elements, having a split mode in which the processing elements are configured to process independent processing workloads. In the split mode the processing elements, which may otherwise be referred to as cores or simply processors, can execute different instruction sequences and access their own defined memory address spaces. Their individual memory address spaces can include regions that map to their local TCM.

In lock mode, the processing elements comprise at least one primary processing element and at least one redundant processing element. Each redundant processing element is configured to perform a redundant processing workload for checking correctness of a primary processing workload performed by the primary processing element. A determination may be made as to whether to operate in split mode or lock mode in dependence on the workload. For example, a safety critical workload may be executed in lock mode to minimise the probability of errors when the speed of processing can be sacrificed for the sake of accuracy. These could be errors cause by hard circuit faults, sub-atomic particle strikes or electromagnetic radiation for example. Conversely, for non-critical processing, split mode may be employed to process workloads quicker where errors can be tolerated.

Each processing element may have an associated local memory comprising a plurality of memory locations. This local memory could be a tightly coupled memory (TCM) or any other memory local to the processing element, and can be constructed for example as random access memory (RAM).

A local memory access control mechanism is provided according to the present technique that, during the lock mode, is configured to allow the at least one primary processing element to access memory locations within the local memory associated with the at least one redundant processing element. That is, during lock mode, the primary processing element has the ability to access main memory locations, local memory locations associated with the primary processor's TCM, and local memory locations associated with the redundant processor's TCM. As a result, the effective local memory capacity is increased by incorporating the redundant processor's TCM within the address space accessible to the primary processing element when executing in the lock mode.

In at least one example of the present technique, during the lock mode, accesses to memory are performed in response to memory access requests issued by the primary processing element when performing the primary processing workload. Corresponding memory access requests issued by the redundant processing element when performing the redundant processing workload are prevented from causing accesses to memory. When operating in lock mode, the redundant processor is used to check that the processing performed by the primary processor is correct. As such, when a memory access is performed, the request from the primary processor is propagated to the appropriate memory and the access carried out. This could be a read or a write access. The redundant processing element, when no errors occur will issue a corresponding request as it is processing the same instructions. This request is compared with the corresponding request from the primary processing element as a check that both processors are attempting the same kind of access to the same memory location. The request from the redundant processor is not propagated to memory as this would lead to two requests to access the same memory location at the same time. Rather, the request from the primary processor is allowed to propagate and complete the access to the memory location, and the result of the access is propagated to both the primary processor and the redundant processor. During the lock mode the corresponding memory access requests issued by the at redundant processing element may thus be used to check the correctness of the primary processing workload.

During the lock mode at least a subset of the memory locations of the local memory associated with the at least one redundant processing element are included within a memory address space identifying allowable memory addresses for use by the primary processing element. That is when operating in the lock mode, a memory map is provided that makes both local memory associated with the primary processing element and the redundant processing element accessible to the primary processing element when performing the primary processing workload.

In at least some examples the local memory access control mechanism comprises a local memory access control unit that is associated with each processing element in the cluster. The control unit controls access to the associated local memory of that processing element. An interconnecting signal path may also be provided, to couple an output of the local memory access control unit associated with primary processing element to an input of the local memory associated with the redundant processing element. This means that during the lock mode, the memory access control unit associated with the primary processing element may be arranged, on detecting that a memory access request issued by the at least one primary processing element is seeking to access a memory location within the local memory associated with the redundant processing element, to employ the interconnecting signal path in order to access the local memory associated with the redundant processing element. The control unit is therefore able to route access requests issued by the primary processor to the local memory of the redundant processor via a dedicated signal path.

During the lock mode a result produced as a result of the memory access request issued by the primary processing element is propagated to both the at least one primary processing element and the at least one redundant processing element. This ensures that the result of the memory access is the same and is provided to both of the redundant and primary processors. This result may be used in further processing operations, so it is important for error checking comparisons that they are both provided with the same information. In the case of a read request, the result may be the value being read from the local memory. In the case of a write request, the result may simply be a confirmation that the write operation has been completed.

In at least some examples the primary processing element has a primary request channel and a secondary request channel for issuing memory access requests. During the lock mode, the primary processing element is arranged, in response to determining that an access to a memory location within its associated local memory is required, to issue a memory access request over the primary request channel identifying that memory location. That is, memory requests targeted at the local memory associated with the primary processing element are issued via the primary request channel.

The at least one primary processing element is further arranged, in response to determining that an access to a memory location within the local memory associated with the at least one redundant processing element is required, to issue a memory access request over the secondary request channel identifying that memory location. Hence, if the memory access request is targeting the local memory associated with the redundant processing element, it is issued via the secondary channel.

It should be noted that each of the processing elements can be constructed identically in one example implementation, and hence a processing element that is used as a redundant processing element in the lock mode may also have a primary request channel and a secondary request channel.

In implementations adopting the earlier-mentioned interconnecting signal path, then during the lock mode, the local memory access control unit associated with the primary processing element may be arranged, on detecting receipt of a memory access request via the secondary request channel, to employ the interconnecting signal path in order to access the local memory associated with the redundant processing element. This means that an explicit determination of the intended destination of the access does not need to be made by the local memory access control unit (that determination having already been made by the primary processing element), and the local memory access control unit is able to correctly route the request to the destination local memory dependent on the channel via which the request was received.

In an alternative implementation, the processing elements may not issue access requests directly to their associated local memory access control units. Instead, the processing cluster may further comprise a common access port associated with the local memories of the cluster, the common access port having a primary request channel and a secondary request channel for propagating memory access requests to the local memories. During the lock mode, the primary processing element may be arranged to issue a memory access request via the common access port when performing the primary processing workload. This means that in response to determining that the memory access request is seeking to access a memory location within the primary processing element's associated local memory, the common access port is arranged to propagate the memory access request over the primary request channel. Conversely the common access port is arranged, in response to determining that the memory access request is seeking to access a memory location within the local memory associated with the at least one redundant processing element, to propagate the memory access request over the secondary request channel. By such an approach, there is no longer a need for the primary processing element to work out which local memory is seeking to be accessed, and instead that task can be devolved to the common access port, hence improving efficiency of operation of the primary processing element.

The common access port may have determination logic and or access to the memory map which enables it to determine which of the local memories the request is targeting. If the request is targeting the local memory of the primary processing element, it is propagated towards the appropriate local memory via the primary channel. Likewise, if the request is determined to be targeting the local memory of the redundant processing element it is propagated via the secondary request channel. As in the earlier example where the primary processing element made this determination, this means that the memory access control unit does not need to make an active determination as to the destination of the access but rather it is inferred from the channel on which the request is received.

In at least one example employing the above-discussed common access port, the cluster still includes a local memory access control unit associated with each processing element and an interconnecting signal path coupling an output of the local memory access control unit associated with the primary processing element to an input of the local memory associated with the redundant processing element. During the lock mode, the memory access control unit associated with the at least one primary processing element may be arranged, on detecting receipt of a memory access request issued via the common access port over the secondary request channel, to employ the interconnecting signal path in order to access the local memory associated with the at least one redundant processing element.

In some examples, each one of the local memories has an associated private access port, with each private access port coupled to both the primary request channel and the secondary request channel. The common access port is then arranged to broadcast the memory access request over the selected channel to both the private access port of primary processing element and the private access port of the redundant processing element. In this way, both of the local access control units receive the request via the private access port, on the appropriate channel, regardless of whether or not the access is targeted at the local memory associated with the redundant or primary processing element. This assists in checking correctness of the primary processing workload by ensuring that appropriate checks can still be carried out despite the fact that in this example implementation the local access control units are not receiving requests directly from their associated processing elements.

In one example implementation, the common access port may be arranged to provide access to the local memories by a device external to the cluster of processing elements. Hence, another device outside of the processing cluster may be able to access the local memories associated with the processing elements via the common access port. For example, during start-up instructions and/or data might be loaded into a TCM by such an external device to define an initial state of the TCM for use by the associated processor. Data may be moved from main memory to the local memory during this process, but as discussed earlier it will then exist in its own distinct address space since the TCM has its own address range in the memory address space distinct from the addresses associated with main memory (i.e. such data is not merely a cached copy of data in main memory, but instead after loading into the TCM is treated quite separately to data in the main memory).

Each local memory may be used to store instructions for execution by the associated processing element. In one example the local memory can hence take the form of an instruction TCM, with its own address space distinct from the main memory address space. Such a form of local instruction memory can be present irrespective of whether an instruction cache is also provided or not, and if an instruction cache is provided that will be provided separately to the local instruction TCM.

The local memory may alternatively, or in addition, be used to store data manipulated by the associated processing element when executing instructions. Having data stored in local memory according to the present invention may mean that it is more quickly and more easily retrievable than data stored in main memory. The data stored in the local memory may be values that need to be accessed regularly for example. Hence, in one example the local memory may be a data TCM and, as with the instruction TCM discussed above, can be provided as a separate structure to any data cache provided (unlike a cache the data TCM is not caching a copy of data in main memory but instead has its own range of addresses in the memory address space distinct from the range of addresses associated with main memory).

Comparison circuitry may be employed during the lock mode to compare a memory access request issued by the primary processing element with a corresponding memory access request issued by the redundant processing to establish the correctness of the primary processing workload. When operating in lock mode, both processing elements may be configured to process the same workload with the same timing. So in order to check that an error has not occurred, comparisons are made between the outputs of the two processing elements, including the memory access requests generated. This could include a simple comparator provided to check that the type (read/write) and the target address of the memory access request issued by the primary processing element is the same as the corresponding request issued by the redundant processing element.

When the comparison circuitry detects a mismatch between the memory access request issued by the primary processing element and the corresponding memory request issued by the redundant processing element, the comparison circuitry may be arranged to issue an error signal. The error signal may be asserted straight away, for example in order to prevent the access occurring, or instead could be used to form a log of errors, but with the memory request being allowed to propagate and the memory access completed, according to the request issued by the primary processing element.

Particular examples will now be described with reference to the figures.

FIG. 1 schematically illustrates an example of a processing cluster according to an example implementation. The processing cluster 1 includes processing cores including core0 200 and core0' 400. Each core 200, 400 includes a processing element 201, 401 (also referred to as a processing pipeline) and an associated tightly coupled memory (TCM) 212, 412 inside a TCM wrapper 210, 410. The processing pipelines 201, 401 can issue requests to access the TCMs 212, 412 directly to the TCM wrappers 210, 410. The TCM controllers 211, 411 then manage performance of the requests from the processing pipelines 201, 401. Two channels of communication (which may be referred to herein as the p (primary) channel and the r (redundant) channel) are provided between the processing pipeline and associated TCM wrapper, as denoted by the pairs of arrows in each direction between those component as shown in the figures.

In the following description core0' 400 may otherwise be referred to as core1 when operating in split mode when it is processing an independent workload from core0. When operating in lock mode, it may be referred to as core0' as when processing a redundant workload it can be considered another instance of core0.

Figure 2A:
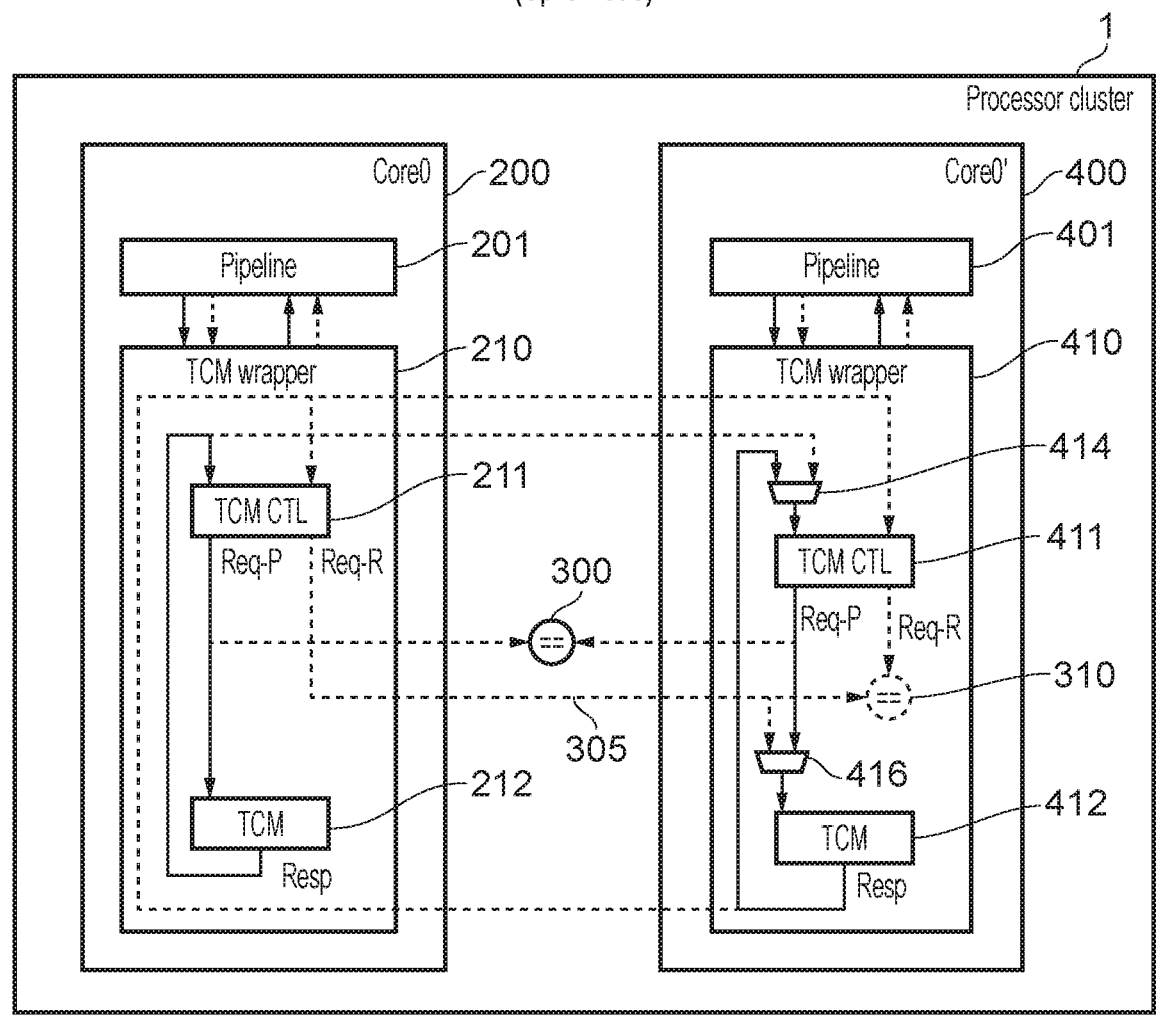
FIG. 2A schematically illustrates the processing cluster of FIG. 1 when operating in a split mode according to an example implementation.

FIG. 2A schematically illustrates the processing cluster of FIG. 1 when operating in a split mode according to an example implementation. The dotted lines illustrate functionality not used in the split mode. In split mode, each of the processing pipelines 201, 401 can operate independently performing their own processing workloads, and may issue TCM access requests to the corresponding TCM wrapper 210, 410, this being shown in the figure by the solid downward arrow indicating that the request is issued via the p-channel. The appropriate TCM controller 211, 411 then propagates the request via the Req-P channel to the TCM 212, 412 of the same core. The access is completed at the TCM 212, 412 and the result propagated to the TCM controller 211, 411 as shown by the Resp—response channel. This response is then propagated from the TCM controller 211, 411 to the processing pipeline 201, 401, as denoted by the solid upward arrow between each TCM wrapper 210, 410 and associated pipeline 201, 401. Note that in this scheme, the interconnecting paths between the cores 200, 400 are not used. The multiplexers 414 and 416 of core0' 400 route requests (and corresponding responses) received on the primary channel during split mode to the TCM 412 (and TCM controller 411) of core0' 400. In lock mode, requests (and responses) received on the redundant channel are routed to the TCM 412 (and TCM controller 411) of core0' 400.

Figure 2B:
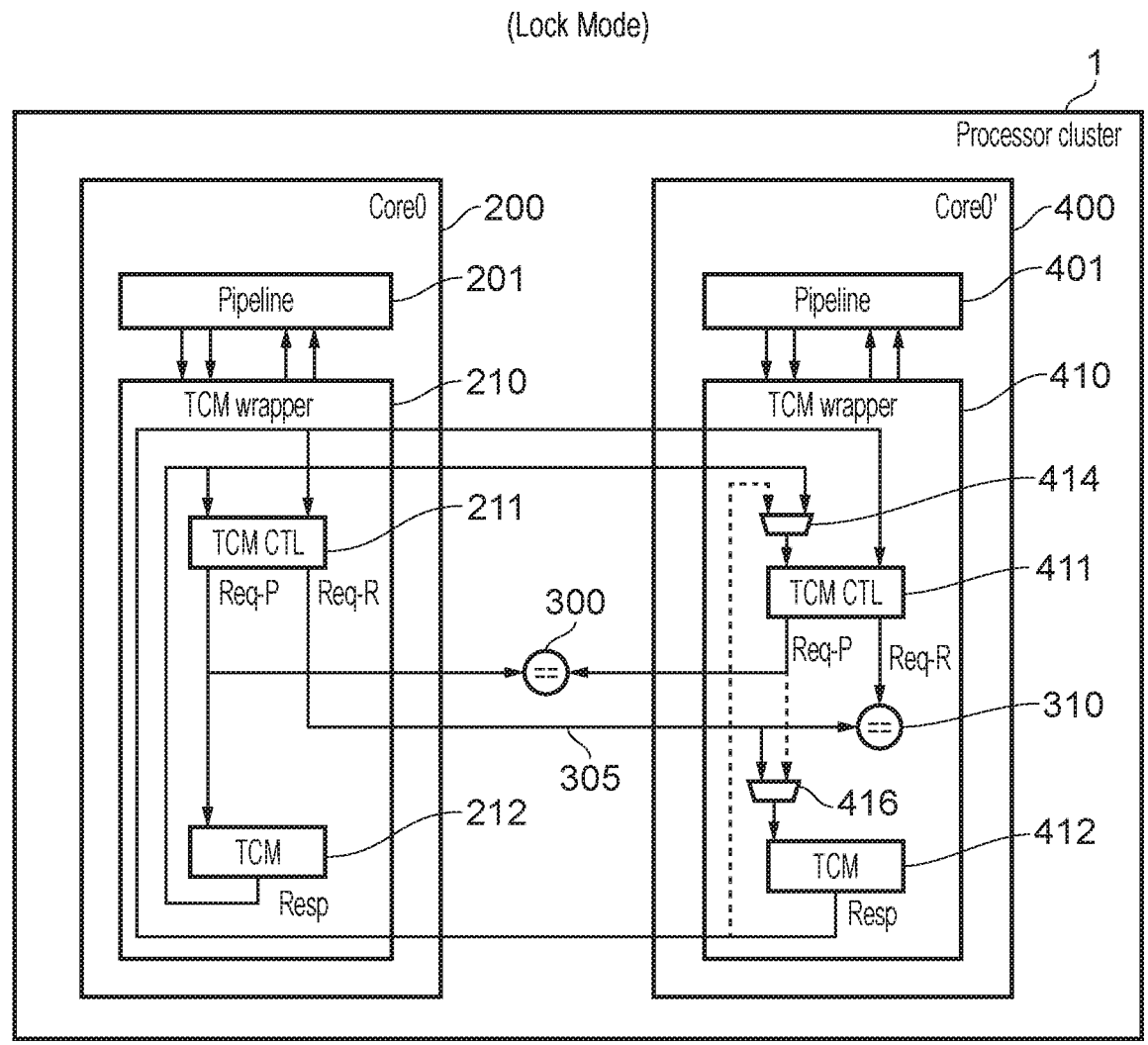
FIG. 2B schematically illustrates the processing cluster of FIG. 1 when operating in a lock mode according to an example implementation.

FIG. 2B schematically illustrates the processing cluster of FIG. 1 when operating in a lock mode according to an example implementation. Both of the cores 200, 400 with processing pipelines 201, 401 processes the same workload when operating in lock mode, with core0 200 acting as a primary core and core0' 400 acting as the redundant core. A request issued by the processing pipeline 201, 401 is propagated via a channel dependent on whether its target address is the TCM 212 of core0 200 or the TCM 412 of core0' 400. Hence the two channels shown as downward arrows from the pipeline 201, 401 to the TCM wrapper 210, 410. The request is then propagated from the TCM controllers 211, 411 on the Req-P channel for requests targeting the TCM 212 of core0 200 and on the Req-R channel for requests targeting the TCM 412 of core0' 400.

A request issued from the TCM controller 211 of core0 200 on the Req-P channel is compared to the corresponding request from the TCM controller of core0' 411 on the Req-P channel by comparator 300. However, the request from core0' is not propagated any further. Instead, the request from the TCM controller 211 of core0 200 is propagated to the TCM 212 of core0 200 (given that it is on the Req-P channel). The response to the request is sent from the TCM 212 to both of the TCM controllers 211, 411, where it is received at the p-channel input. The controllers then forward that result back to their respective pipelines 201, 401, again utilising the p channel to indicate that the response has come from the TCM 212 of core0 200.

A request issued from the TCM controller 211 of core0 200 on the Req-R channel is compared to the corresponding request from the TCM controller 411 of core0' 400 by comparator 310. The request from core0 200 is propagated to the TCM 412 of core0' 400 (the redundant core) via the Req-R channel, which incorporates the interconnecting signal path 305 passing between the two cores, and the access is completed at the TCM 412. The response is propagated to the TCM controller 211 of core0 200 and the TCM controller 411 of core0' 400, where it is received at the r-channel input. The result is then forwarded back to their respective pipelines 201, 401 from the TCM wrappers 210, 410, again utilising the r channel to indicate that the response has come from the TCM 412 of core0' 400.

It is clear from the figure and its description that during lock mode, the requests issued by the redundant processing pipeline 401 are not allowed to propagate to the target TCMs 212, 412. Instead, they are used to compare with the requests issued by the primary processing pipeline 201. The results are propagated to both cores 200, 400 so as to ensure that both pipelines 201, 401 are provided with the same results.

It will be appreciated that in this configuration, the processing pipelines have a memory map that includes address ranges not only for main memory but also separate address ranges for each TCM. Each processing pipeline can then determine when generating an access request whether TCM is being accessed, and hence whether the request should be issued to the associated TCM wrapper. In addition, it can determine which TCM contains the target memory address, and hence determine which channel to output the request on (i.e. the channel corresponding to the TCM being targeted).

Figure 3:
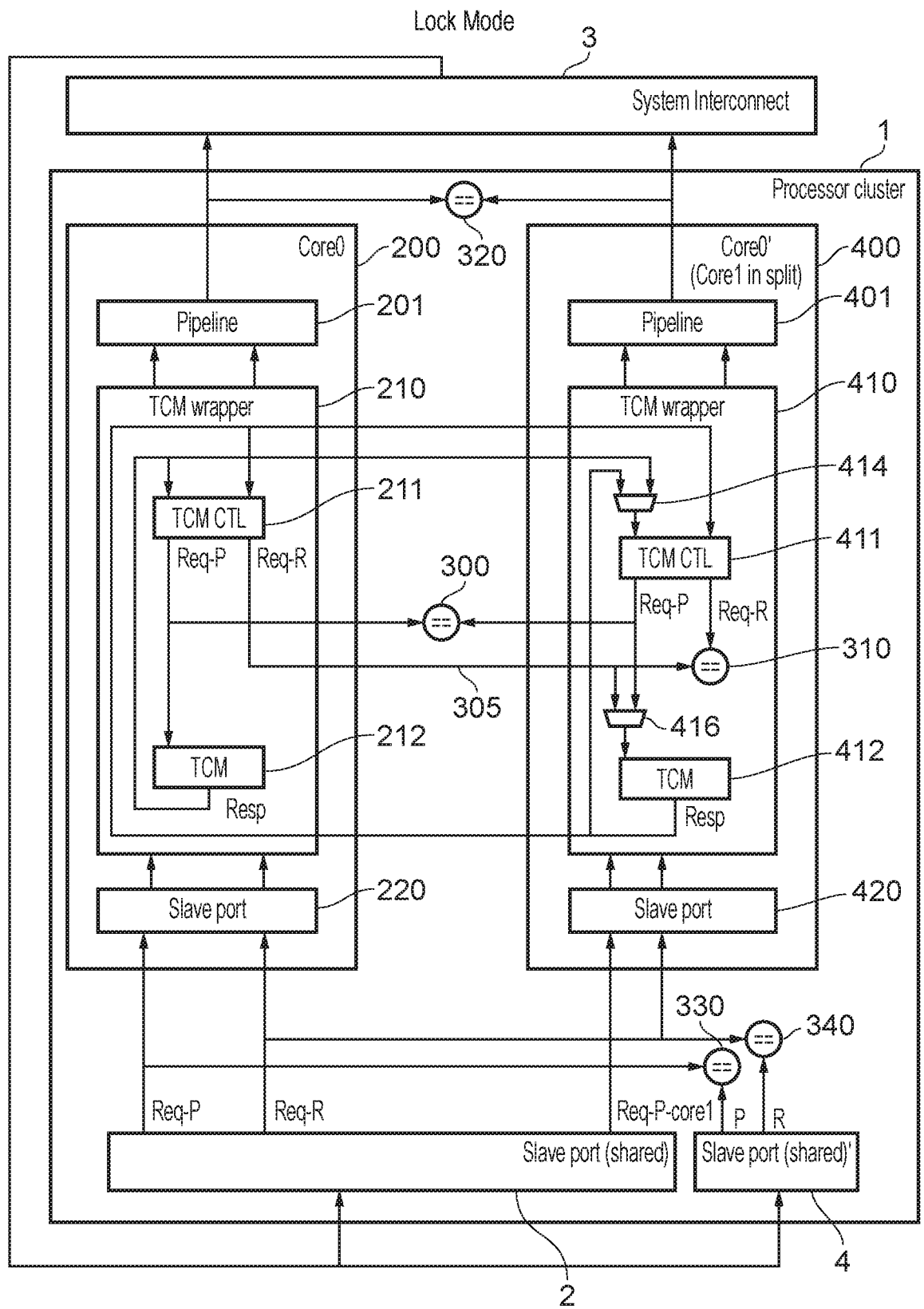
FIG. 3 schematically illustrates a processing cluster operating according to an alternative example implementation.

FIG. 3 schematically illustrates an example of a processing cluster system according to an alternative example implementation where each pipeline is arranged to issue access requests via a system interconnect even if they are accesses to TCM (in the example implementation of FIGS. 1, 2A and 2B the pipeline may only have done that if the access was to main memory, and as discussed earlier would directly route requests to its local TCM wrapper if the access was a TCM access). The processing cluster 1 contains elements similar to those described with reference to FIG. 1 above. Further, a system interconnect 3 is provided which can route requests to the shared slave ports 2, 4. The shared slave port 4 is provided for redundancy to enable checking of the operations performed by the shared slave port 2 when in lock mode. From the shared slave port 2 requests can be propagated to core0 200 via private slave port 220 and to core0' via private slave port 420.

Figure 4A:
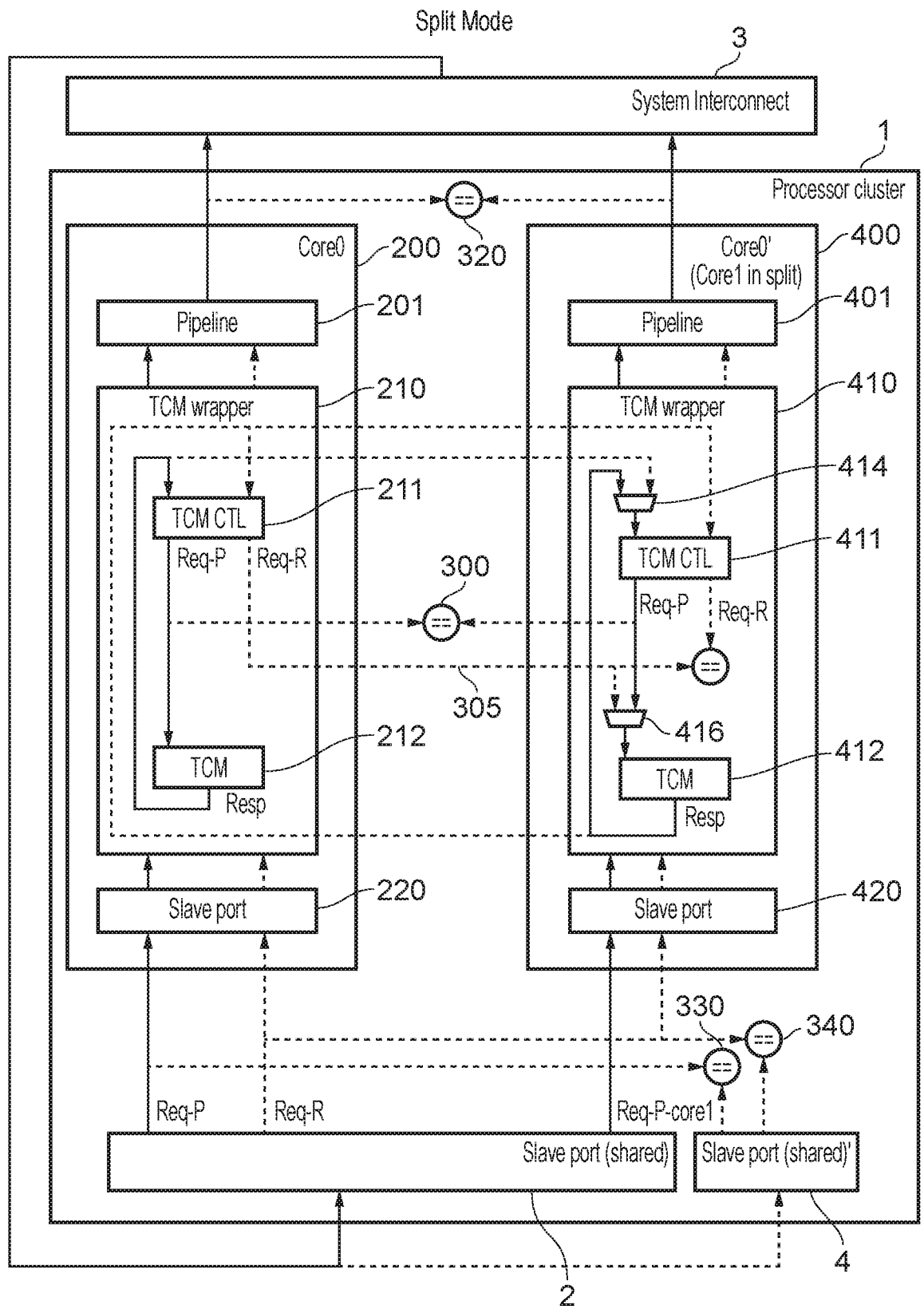
FIG. 4A schematically illustrates the processing cluster of FIG. 3 when operating in a split mode according to an example implementation.

FIG. 4A schematically illustrates the processing cluster system of FIG. 3 when operating in a split mode according to an example implementation. The processing pipelines 201, 401 process independent workloads when operating in split mode. Access to both main memory and the TCMs 212, 412 are issued by the processing pipeline to the system interconnect 3. The system interconnect 3 is able to determine whether the target address of the request is in main memory or in one of the TCMs 212, 412. Requests to access the TCMs are routed to the shared slave port 2 which is able to determine which of the TCMs 212 412 is being targeted. Requests for the TCM 212 of core0 200 are routed via the Req-P channel to the private slave port 220 associated with core0 200 and the TCM controller 211 then controls the access to the TCM 212 in the same way as discussed earlier in FIG. 2A, with the result from this request being propagated to the pipeline 201 from the TCM wrapper 210 via the p-channel.

Requests targeted at the TCM 412 associated with core0' 400 are routed by the shared slave port 2 via the Req-P-core1 channel to the private slave port 420 associated with core0' 400. The slave port 420 forwards the request to the TCM wrapper 410 where it is serviced and the result is propagated back to the pipeline 401, the TCM wrapper 410 operating as discussed earlier in FIG. 2A. Thus, as per the example of FIG. 2A, each processing pipeline 201, 401 can access its respective TCM 212, 412.

Figure 4B:
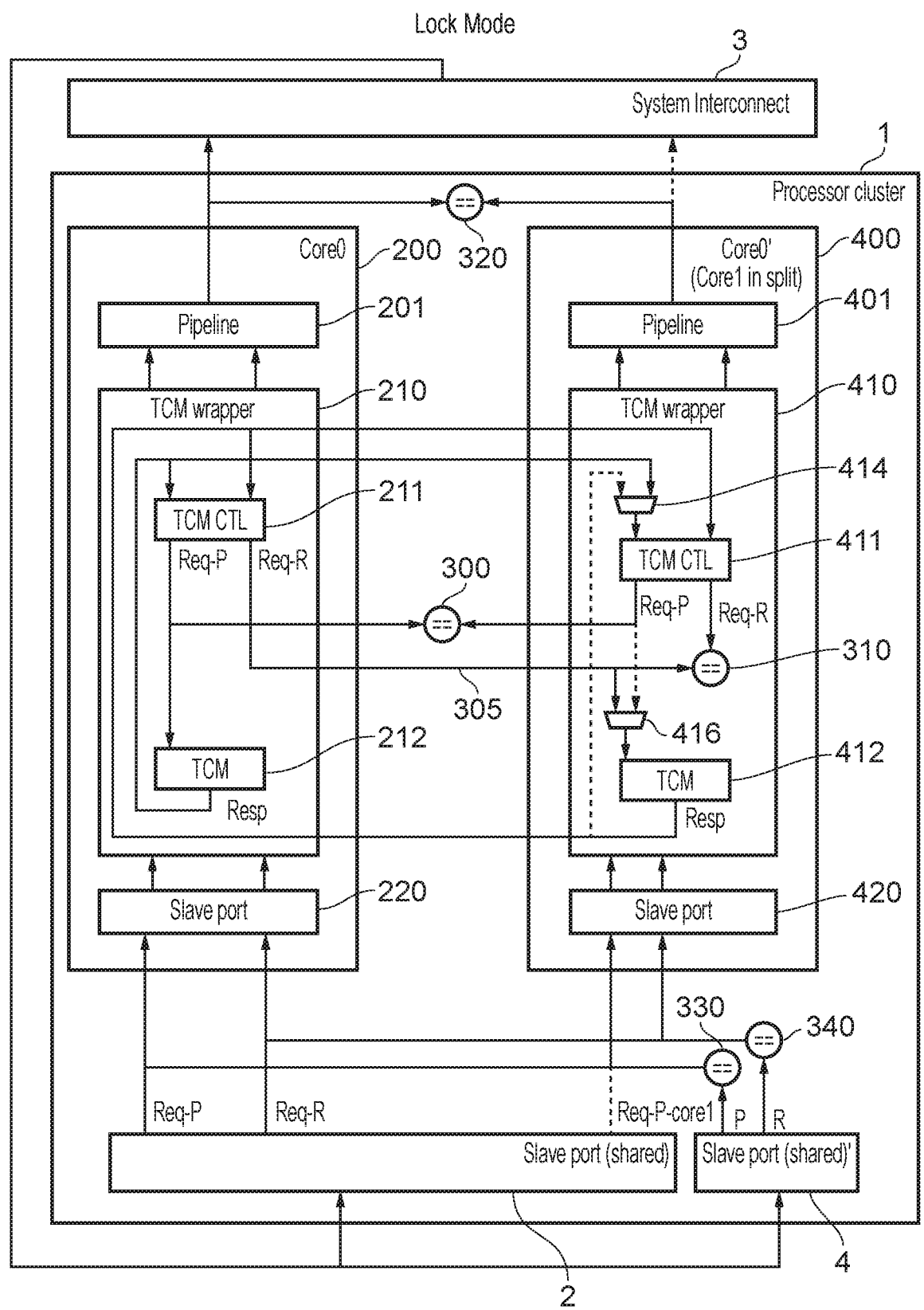
FIG. 4B schematically illustrates the processing cluster of FIG. 3 when operating in a lock mode according to an example implementation.

FIG. 4B schematically illustrates the processing cluster system of FIG. 3 when operating in a lock mode according to an example implementation. In lock mode, core0 200 acts as a primary processor, and core0' 400 acts as a redundant processor. Requests from the redundant pipeline 401 of core0' 400 are not issued to the system interconnect 3, and instead they are compared to the corresponding request form the primary processing pipeline 201 of core0 200 by comparator 320, so that an error can be signalled in the event of a discrepancy. This request from the primary processing pipeline 201 is received by the system interconnect 3, which is able to determine whether the request is targeting main memory or a TCM. If the latter is true, the request is propagated to both the shared slave port 2 and shared slave port 4. These shared slave ports independently determine which of the TCMs the request is targeting and send the requests on the appropriate channel. Requests for the TCM 212 are propagated by the Req-P channels from each of the shared slave ports 2, 4. These are compared by comparator 330 so that an error can be signalled in the event of a discrepancy, and the request from shared slave port 2 is propagated to both of the slave ports 220 and 420 of the cores 200 and 400 via the p-channel. The requests are then propagated on to the TCM controllers 211, 411, via the p-channel, where they are then handled in the same way as discussed above with reference to FIG. 2B.

Similarly, requests for the TCM 412 are propagated via the Req-R channels from each of the slave ports 2, 4. The request from the shared slave port' 4 is compared with the request from the shared slave port 2 by the comparator 340, and the request from the slave shared slave port 2 is propagated to both of the private slave ports 220 and 420 over the r-channel. The requests are then propagated on to the TCM controllers 211, 411, via the r-channel, where they are then handled in the same way as discussed above with reference to FIG. 2B.

The process of using both shared slave ports 2, 4, and the comparisons using the comparators 330, 340 ensures that the determination as to which TCM is being accessed has been carried out correctly, and that the request contents produced by each slave port 2, 4 are identical. As with the previous example implementation the request of the redundant processor is used to determine the correctness of the primary processing workload and is not propagated to the TCM itself.

By using such an approach as discussed with reference to FIG. 4B rather than the approach discussed with reference to FIG. 2B, there is no longer a need for the pipelines to work out which TCM is being accessed, and instead that task can be devolved to the shared slave port 2, 4 (also referred to herein as the common access port), hence improving efficiency of operation of the pipelines.

Figure 5:
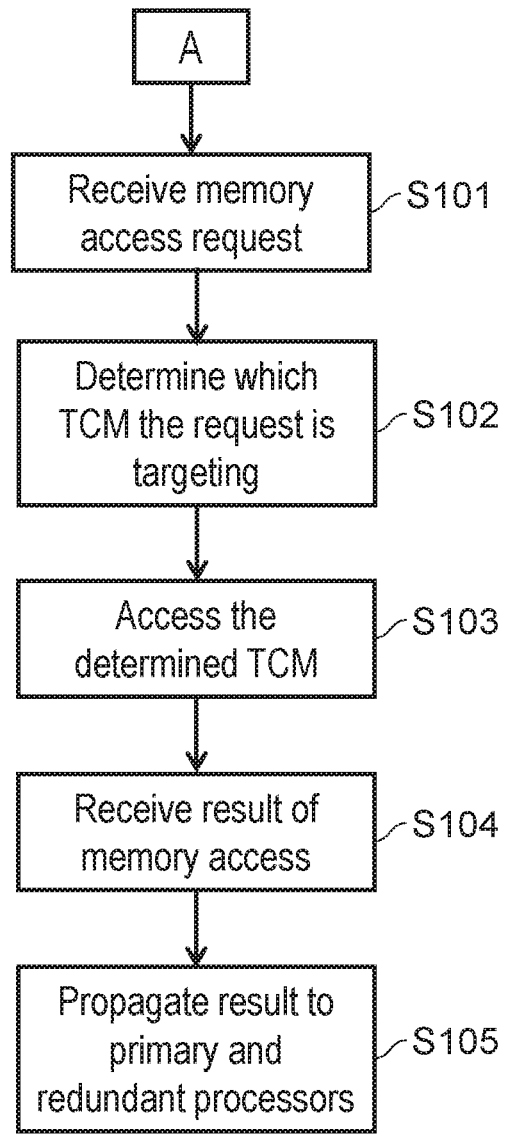
FIG. 5 shows a flow diagram illustrating steps in a method for accessing a tightly coupled memory (TCM) when a processing cluster is operating in lock mode in accordance with one example implementation.

FIG. 5 shows a flow diagram illustrating steps in a method for accessing a TCM when a processing cluster is operating in lock mode in accordance with one example implementation. At step S101 the memory access is received by the TCM controller, and a determination is then made at step S102 as to which TCM the memory access request is targeting. The TCM is accessed at step S103, although if the memory request has come from the redundant processor, it may be the corresponding request from the primary processor that is used when actually carrying out the memory access. The result of the memory access is then received at step S104, which could be the value accessed by a read request or a confirmation that a write request has taken place for example. At step S105 the result is propagated to both the primary and the redundant processing pipelines.

Figure 6:
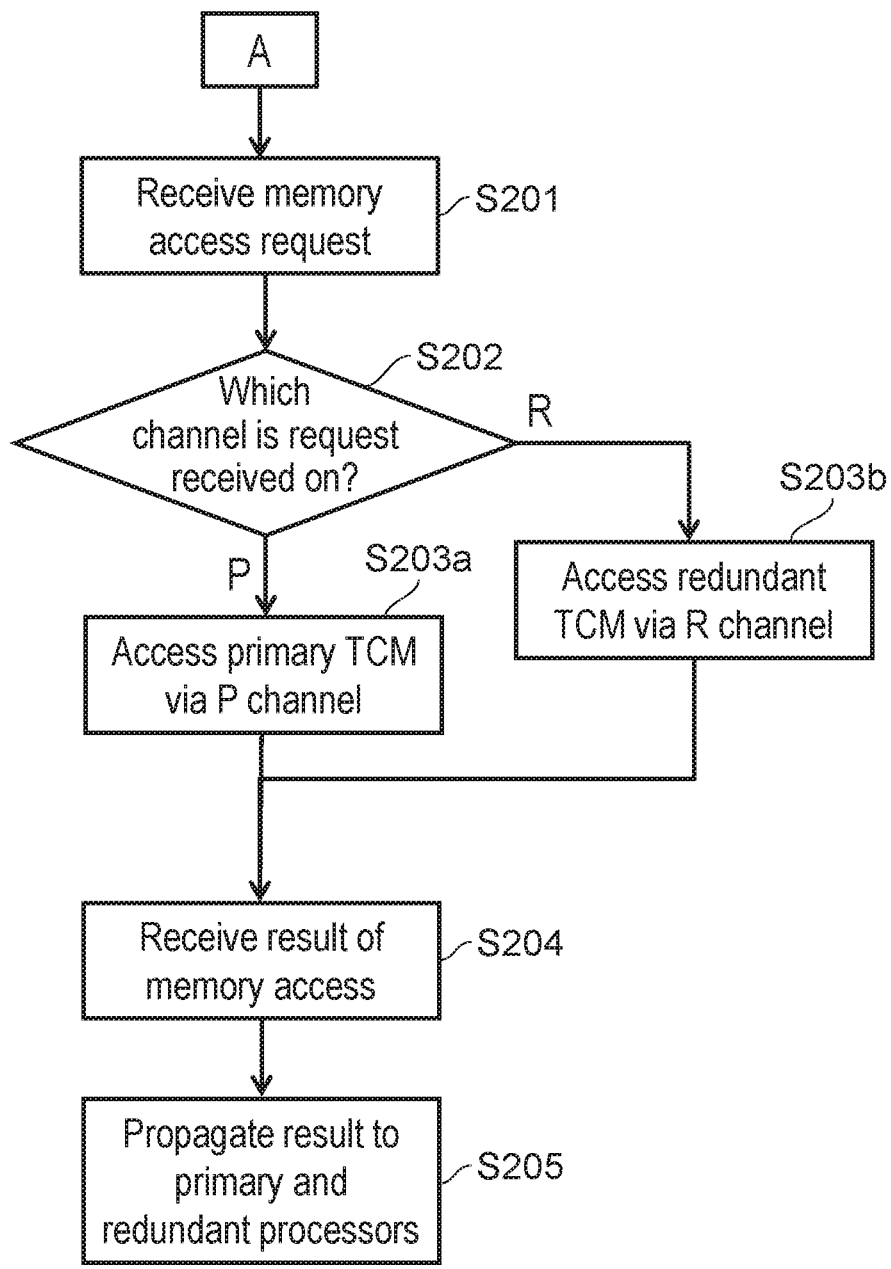
FIG. 6 shows a flow diagram illustrating steps in a method for accessing a TCM when a processing cluster is operating in lock mode, in accordance with a channel-based access mechanism employed in one example implementation.

FIG. 6 shows a flow diagram illustrating steps in a method for accessing a TCM when a processing cluster is operating in lock mode in accordance with one particular example implementation utilising the separate channels discussed earlier. At step S201 the memory request is received on one of two channels. At step S202 a determination is made as to which of the two channels the request has been received on. If received on the P channel, the access is determined to be targeting the TCM of the primary processor and this TCM is accessed at step S203a. If the request is received on the R channel, it is determined to be targeting the TCM associated with the redundant processor, and this TCM is accessed at step S203b. In either case the result of the memory access is received and propagated to the primary and redundant processors at steps S204 and S205.

Figure 7:
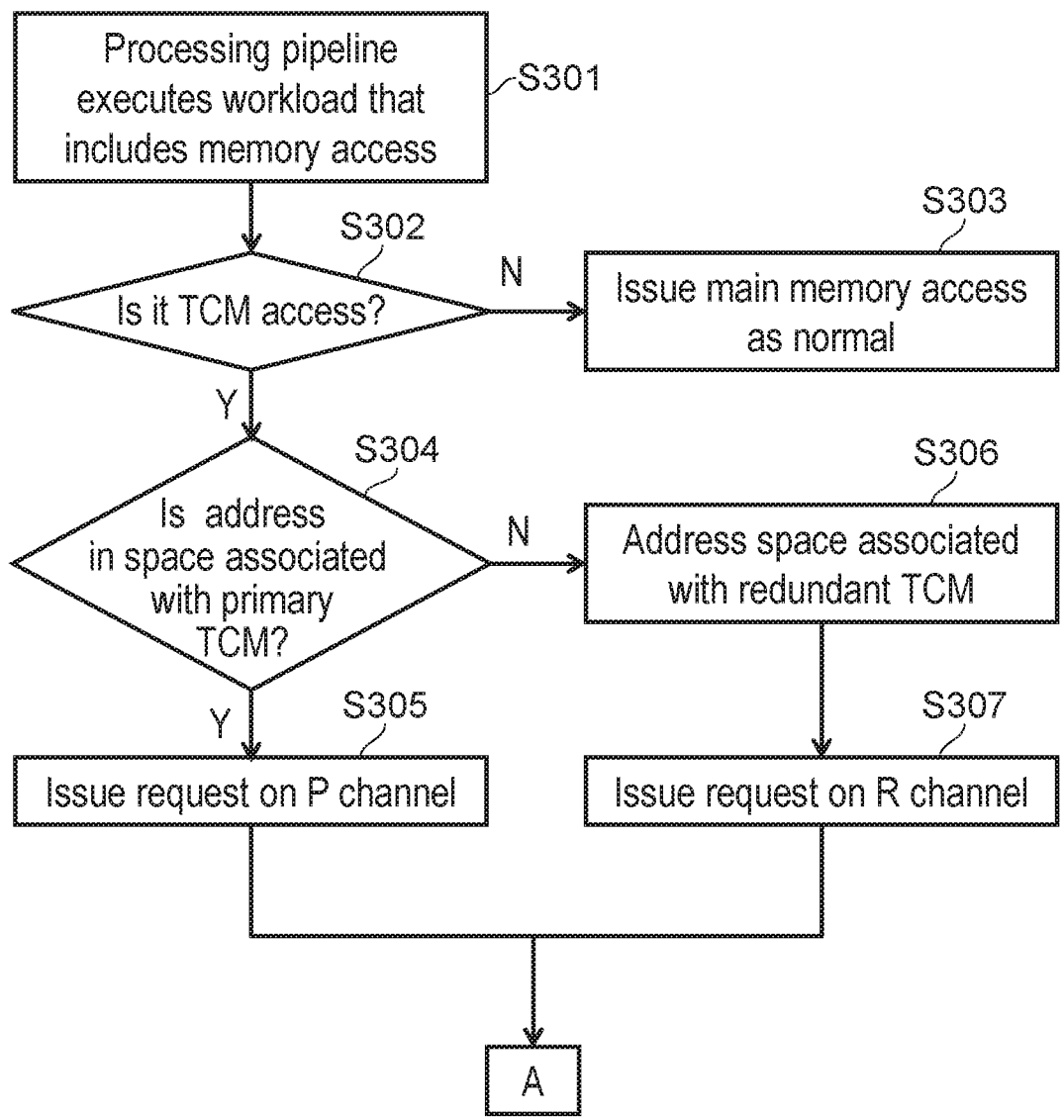
FIG. 7 shows a flow diagram illustrating steps in a method for determining the channel of a TCM access request in accordance with one example implementation.

FIG. 7 shows a flow diagram illustrating steps in a method for determining the channel of a TCM access request in accordance with one example implementation where the determination is made by the processing pipeline. At step S301 the processing pipeline executes an instruction that includes a memory access. At step S302 it is determined whether or not this is a TCM access. If it is not, then at step S303 it is assumed that the target is in main memory and the request is allowed to progress as per the normal main memory access protocol. If at step S302 it is determined to be a TCM access, then another determination is made at step S304 as to whether the address of the request is associated with the primary TCM. If so, then at step S305, the request is issued via the P channel, and the memory access continues as per the methods described in one of FIG. 5 or FIG. 6. If at step S304 the address is not associated with the primary TCM it is assumed to be associated with the redundant TCM at step S306. The request is then issued via the R channel at step S307 and the process again progresses to one of the previously described methods.

Figure 8:
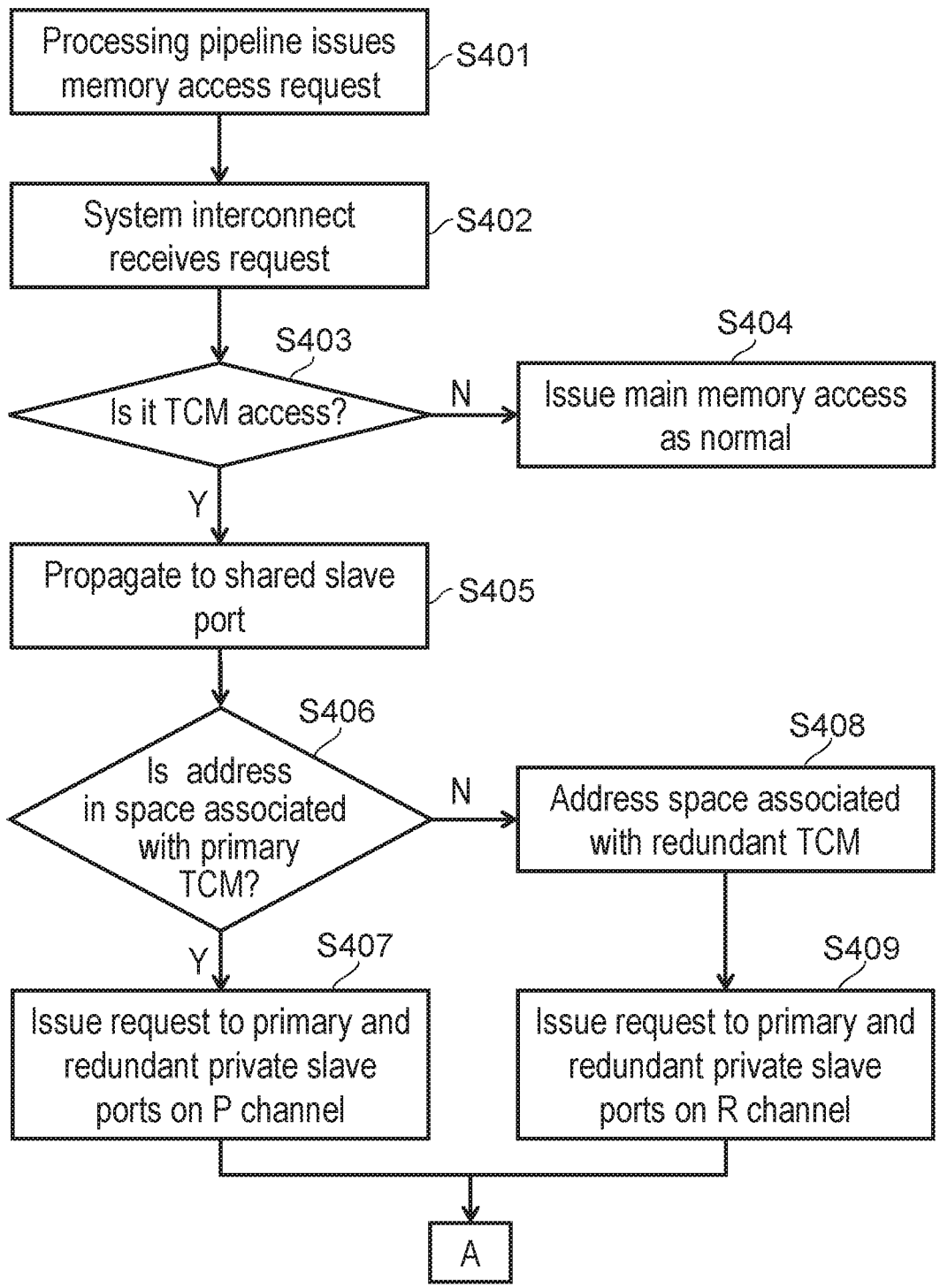
FIG. 8 shows a flow diagram illustrating steps in a method for determining the channel of a TCM access request in accordance with another example implementation.

FIG. 8 shows a flow diagram illustrating steps in a method for determining of the channel of a TCM in accordance with another example implementation, where the determination is made by the shared slave port. At step S410 the processing pipeline issues a memory access request which is received by the system interconnect at step S402. The system interconnect determines whether the request is a TCM access at step S403. If not, then the request is treated as a "normal" main memory request at step S404. If the request is a TCM request, then at step S405 is it propagated to the shared slave port. At step S406 the shared slave port determines whether the request is targeting an address associated with the TCM of the primary core. If so, then the request is issued to both private slave ports of the redundant and primary cores on the P channel at step S407, and the method then proceeds to one of the example implementations described in FIGS. 5 & 6. If at step S406 the address space is determined not to be associated with the primary TCM it is assumed at step S408 to be associated with the redundant TCM. At step S409 the request is therefore propagated via the private slave ports to both the primary and redundant cores on the R channel, and the method then proceeds to one of the example implementations described in FIGS. 5 & 6.

By using the techniques described herein, a split-lock configuration of processing cluster can be adopted, but without the local memory resource of a core used as a redundant core in the lock mode going unused. Hence the efficiency of the design can be improved. In particular, when in lock mode the capacity of the local memory can be significantly increased without adding further memory into the design, by facilitating the use of memory resource that would typically be unavailable in lock mode.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative example implementations of the invention have been described in detail herein with reference to the accompanying drawings, it is to be understood that the invention is not limited to those precise example implementations, and that various changes and modifications can be effected therein by one skilled in the art without departing from the scope and spirit of the invention as defined by the appended claims.

We claim:

1. An apparatus comprising:
   a cluster of processing elements, having a split mode in which the processing elements are configured to process independent processing workloads, and a lock mode in which the processing elements comprise at least one primary processing element and at least one redundant processing element, each redundant processing element configured to perform a redundant processing workload for checking correctness of a primary processing workload performed by the primary processing element;
   each processing element having an associated local memory comprising a plurality of memory locations; and
   a local memory access control mechanism that is configured, during the lock mode, to allow the at least one primary processing element to access memory locations within the local memory associated with the at least one redundant processing element.

2. The apparatus according to claim 1, wherein during the lock mode accesses to memory are performed in response to memory access requests issued by the at least one primary processing element when performing the primary processing workload, and corresponding memory access requests issued by the at least one redundant processing element when performing the redundant processing workload are prevented from causing accesses to memory.

3. The apparatus according to claim 2, wherein during the lock mode the corresponding memory access requests issued by the at least one redundant processing element when executing the redundant processing workload are used when checking correctness of the primary processing workload.

4. The apparatus according to claim 1, wherein during the lock mode at least a subset of the memory locations of the local memory associated with the at least one redundant processing element are included within a memory address space identifying allowable memory addresses for use by the at least one primary processing element when performing the primary processing workload.

5. The apparatus according to claim 1 wherein the local access control mechanism comprises:
   a local memory access control unit associated with each processing element in the cluster to control access to the associated local memory of that processing element; and
   an interconnecting signal path coupling an output of the local memory access control unit associated with the at least one primary processing element to an input of the local memory associated with the at least one redundant processing element;
   wherein, during the lock mode, the memory access control unit associated with the at least one primary processing element is arranged, on detecting that a memory access request issued by the at least one primary processing element when performing the primary processing workload is seeking to access a memory location within the local memory associated with the at least one redundant processing element, to employ the interconnecting signal path in order to access the local memory associated with the at least one redundant processing element.

6. The apparatus according to claim 2, wherein during the lock mode a result produced as a result of processing the memory access request issued by the at least one primary processing element when performing the primary processing workload is propagated to both the at least one primary processing element and the at least one redundant processing element.

7. The apparatus according to claim 1, wherein:
   each of the at least one primary processing elements has a primary request channel and a secondary request channel for issuing memory access requests;
   during the lock mode, the at least one primary processing element is arranged, in response to determining that an access to a memory location within its associated local memory is required, to issue a memory access request over the primary request channel identifying that memory location; and
   during the lock mode, the at least one primary processing element is arranged, in response to determining that an access to a memory location within the local memory associated with the at least one redundant processing element is required, to issue a memory access request over the secondary request channel identifying that memory location.

8. The apparatus according to claim 7, wherein the local access control mechanism comprises:
   a local memory access control unit associated with each processing element in the cluster to control access to the associated local memory of that processing element; and
   an interconnecting signal path coupling an output of the local memory access control unit associated with the at least one primary processing element to an input of the local memory associated with the at least one redundant processing element;
   wherein, during the lock mode, the local memory access control unit associated with the at least one primary processing element is arranged, on detecting receipt of a memory access request issued by the at least one primary processing element via the secondary request channel, to employ the interconnecting signal path in order to access the local memory associated with the at least one redundant processing element.

9. The apparatus according to claim 1, further comprising:
   a common access port associated with the local memories of the cluster, the common access port having a primary request channel and a secondary request channel for propagating memory access requests to the local memories;
   during the lock mode, the at least one primary processing element is arranged to issue a memory access request via the common access port when performing the primary processing workload;
   the common access port is arranged, in response to determining that the memory access request is seeking to access a memory location within the at least one primary processing element's associated local memory, to propagate the memory access request over the primary request channel; and
   the common access port is arranged, in response to determining that the memory access request is seeking to access a memory location within the local memory associated with the at least one redundant processing element, to propagate the memory access request over the secondary request channel.

10. The apparatus according to claim 9, wherein the local access control mechanism comprises:
a local memory access control unit associated with each processing element in the cluster to control access to the associated local memory of that processing element; and
an interconnecting signal path coupling an output of the local memory access control unit associated with the at least one primary processing element to an input of the local memory associated with the at least one redundant processing element;
wherein, during the lock mode, the memory access control unit associated with the at least one primary processing element is arranged, on detecting receipt of a memory access request issued via the common access port over the secondary request channel, to employ the interconnecting signal path in order to access the local memory associated with the at least one redundant processing element.

11. The apparatus according to claim 9, wherein each one of the local memories has an associated private access port, each private access port coupled to both the primary request channel and the secondary request channel, and the common access port being arranged to broadcast the memory access request over the selected one of the primary request channel and the secondary request channel to both the private access port of the at least one primary processing element and the private access port of the at least one redundant processing element.

12. The apparatus according to claim 9, wherein the common access port is arranged to provide access to the local memories by a device external to the cluster of processing elements.

13. The apparatus according to claim 1, wherein the associated local memory is scratchpad memory.

14. The apparatus according to claim 1 wherein each local memory is used to store at least one of instructions for execution by the associated processing element and data manipulated by the associated processing element when executing the instructions.

15. The apparatus according to claim 1, further comprising comparison circuitry employed during the lock mode to compare a memory access request issued by the at least one primary processing element when executing the primary processing workload with a corresponding memory access request issued by the at least one redundant processing element when executing the redundant processing workload to establish the correctness of the primary processing workload.

16. The apparatus according to claim 15 wherein when the comparison circuitry detects a mismatch between the memory access request issued by the at least one primary processing element when executing the primary processing workload and the corresponding memory request issued by the at least one redundant processing element when executing the redundant processing workload, the comparison circuitry is arranged to issue an error signal.

17. A method for operating a data processing apparatus comprising a cluster of processing elements, comprising:
when operating the cluster in a split mode, processing independent processing workloads on the processing elements of the cluster;
when operating the cluster in a lock mode, arranging the processing elements to comprise at least one primary processing element and at least one redundant processing element, performing a primary processing workload on the at least one primary processing element, and performing on the at least one redundant processing element a redundant processing workload for checking correctness of the primary processing workload performed by the primary processing element;
providing each processing element with an associated local memory comprising a plurality of memory locations; and
during the lock mode, employing a local memory access control mechanism to allow the at last one primary processing element to access memory locations within the local memory associated with the at least one redundant processing element.

18. An apparatus comprising:
a cluster of processing means, having a split mode in which the processing means are configured to process independent processing workloads, and a lock mode in which the processing means comprise at least one primary processing means and at least one redundant processing means, each redundant processing means for performing a redundant processing workload for checking correctness of a primary processing workload performed by the primary processing means;
each processing means having an associated local memory means comprising a plurality of memory locations; and
local memory access control means for allowing, during the lock mode, the at last one primary processing means to access memory locations within the local memory associated with the at least one redundant processing means.

* * * * *